United States Patent [19]

Inoue et al.

[11] Patent Number: 4,550,977
[45] Date of Patent: Nov. 5, 1985

[54] REAR PROJECTION SCREEN

[75] Inventors: Masao Inoue; Shingo Suzuki, both of Tokyo, Japan

[73] Assignee: Mitsubishi Rayon Co., Ltd., Tokyo, Japan

[21] Appl. No.: 619,966

[22] Filed: Jun. 12, 1984

[30] Foreign Application Priority Data

Jun. 13, 1983 [JP] Japan .............................. 58-105341

[51] Int. Cl.$^4$ ............................................. G03B 21/60
[52] U.S. Cl. .................................................. 350/128
[58] Field of Search ................................. 350/127, 128

[56] References Cited

U.S. PATENT DOCUMENTS

| 4,147,408 | 4/1979 | Plummer | 350/128 |
| 4,165,154 | 8/1979 | Takahashi | 350/128 |
| 4,309,073 | 1/1982 | Nishimura et al. | 350/128 |
| 4,374,609 | 2/1983 | Lange | 350/128 |
| 4,418,986 | 12/1983 | Yata et al. | 350/128 |
| 4,452,509 | 6/1984 | Van Breemen | 350/128 |
| 4,469,402 | 9/1984 | Yata et al. | 350/128 |
| 4,509,822 | 4/1985 | Clausen et al. | 350/128 |
| 4,512,631 | 4/1985 | Van Breemen | 350/128 |

Primary Examiner—Richard A. Wintercorn
Attorney, Agent, or Firm—Armstrong, Nikaido, Marmelstein & Kubovcik

[57] ABSTRACT

A rear projection screen has a viewer's side and a projection side on which the image of a source is projected so that the projected image is visible from the viewer's side through the screen. The rear projection screen has a lenticular lens formed on the viewing side and including a multiplicity of vertically extending lens units each being provided at its both sides with total reflection surfaces. The lenticular lens further includes in the troughs between adjacent lens units a multiplicity of refraction elements which diffuse the light in the vertical direction. The angular field of vision is increased in the horizontal direction by the vertical lens units and also in the vertical direction by the refraction elements.

4 Claims, 14 Drawing Figures

REAR PROJECTION SCREEN

BACKGROUND OF THE INVENTION

The present invention relates to a rear projection screen improved to increase the field of vision not only horizontally but vertically as well.

The rear projection screen used for a video projection screen is required to have a high brightness and a wide field of vision for making the image more visible and distinct from a wider angle of vision. To this end, hitherto, various measures have been taken, such as, for example, the provision of lenticulation to the surface of the screen plate. The lenticulation of the screen plate, however, can widen the angular field of vision only up to 30° or so around the optical axis. Therefore, there has been a continuous demand to further increase the field of vision.

From this point of view, the applicants have already proposed a rear projection screen having a lenticulated screen plate in which a part of the light coming from a light source and impinging upon the screen is emitted to the viewing side through total-reflection by the total-reflection surfaces on the vertical lenticule units formed in the lenticulated screen plate. Such a rear projection screen is shown, for example, in the specifications of the U.S. patent application Ser. Nos. 364,193 and 467,509, as well as in the specifications of EP application Nos. 0063317 and 0087753. Using this lenticulated screen plate, it is possible to remarkably widen the visible field in the horizontal direction. Unfortunately, however, these lenticulated screen plates cannot widen the field of vision in the vertical direction. To widen the field of vision also vertically, it has been necessary to form a layer of diffusion agent or to mix a diffusion agent in the material of the screen. Although the use of the diffusion agent is effective to some extent, the light transmittance is lowered to decrease the contrast undesirably, if the concentration of the agent is excessively large. To the contrary, when the concentration of the diffusion agent is lowered, the screen becomes transparent to make the light source visible through the screen plate. It is, therefore, not a better policy to widen the angular field of vision in the vertical direction solely by the diffusion agent.

SUMMARY OF THE INVENTION

In view of the foregoing, the invention aims, as its primary object, at providing a rear projection screen in which the angular field of vision can be widened both horizontally and vertically with a good balance without impairing the resolution and other factors.

To this end, according to the invention, there is provided a rear projection screen having a viewing side and a projection side, the rear projection screen comprising: a lenticular lens formed on the viewing side and including a multiplicity of vertically extending lens units each being provided at its both sides with total reflection surfaces, the lenticular lens further including, in the troughs between adjacent lens units, a multiplicity of refraction elements which difuse the light in the vertical direction.

The above and other objects, features and advantages of the invention will become more clear from the following description of the preferred embodiments taken in conjunction with the accompanying drawings.

DESCRIPTION OF THE PREFERRED EMBODIMENTS

Figure 1:
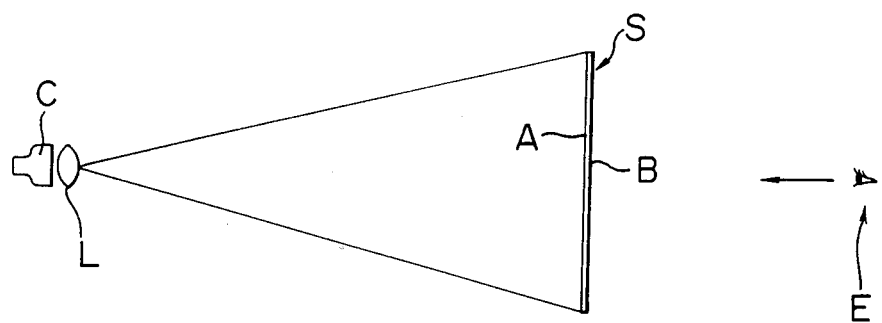
FIG. 1 is a schematic illustration of a projection system making use of a rear projection screen proposed by the present invention.

FIG. 1 shows a projection system making use of a rear projection screen proposed by the invention. This system has a CRT(C) as a light source and a screen (s) on the rear side (A) of which an image from the CRT(C) is projected through a projection lens (L) to permit the viewers to view the projected image from the viewer's side (B) of the screen (S). When this projection system is used as, for example, a projection TV system, it is necessary that the screen has not only a high brightness and a wide angular field of vision in the horizontal direction but also in the vertical direction. As described before, the present inventors have already proposed a rear projection screen in which the angular field of vision is widened in the horizontal direction by providing, on the viewer's side of the screen, lenticular lenses having total reflection surfaces. The present invention aims at further widening the angular field of vision not only in the horizontal direction but also in the vertical direction.

Figure 2:
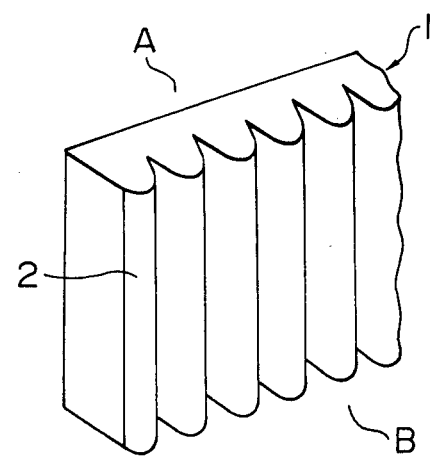
FIG. 2 is a partial perspective view of an embodiment of the invention.
Figure 3:
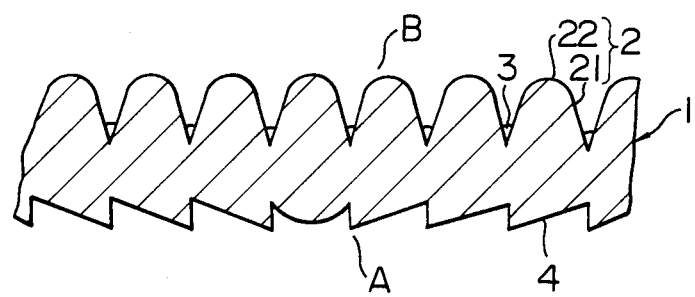
FIG. 3 is a partial sectional view of an embodiment in which a Fresnel lens system is combined with the embodiment shown in FIG. 2.

FIG. 2 shows a typical embodiment of the invention which is provided with a screen base member normally made from a synthetic resin having good light transmitting characteristics such as a methacrylic resin, polycarbonate resin and vinyl chloride resin. The screen base member 1 has two sides: namely, a rear side A and a viewer's side B. Vertical lenticular lenses 2 each having total reflection surfaces are formed on the viewer's side of the screen base member 1. These vertical lenticular lenses 2 constitute a first feature of the invention. The lenticular lenses 2 having total reflection surfaces are so designed that a part of the incident light impinges upon a part or-whole of the flank of the lens unit constituting the lenticular lens 2 and is, through a total reflection, emitted to the viewer's side B. More specifically, as shown in FIG. 3, the lens unit of the lenticular lens 2 is provided at both sides with total reflection surfaces 21 which merge with each other at a crest on which is formed a curved surface 22. The light transmission characteristics of these total reflection surfaces 21 will be described later. These total reflection surfaces, however, do not contribute to the enhancement of the angular field of vision in the vertical direction, although they considerably widens the field of vision in the horizontal direction. According to the invention, the refraction element 3 for effecting a vertical refraction of light is provided in the trough between adjacent lens units. This refraction element 3 constitutes a second feature of the invention. The rear or projection side A of the screen base member 1 may be flat as shown in FIG. 2 or may be provided with a Fresnel lens 4 as shown in FIG. 3 to brighten the screen as a whole. The total reflection surface 21 may be linear as shown in FIG. 3 but may also be curved.

Figure 4:
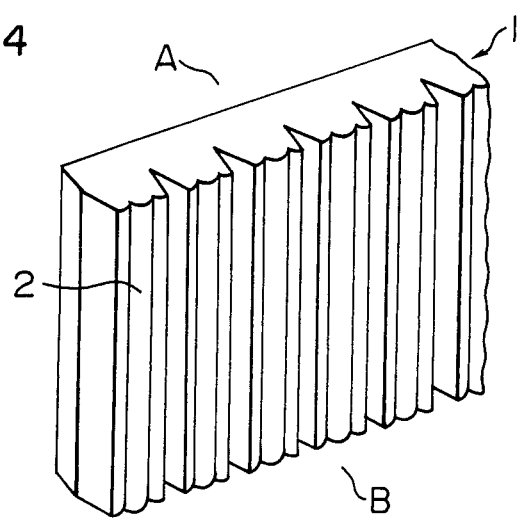
FIG. 4 is a partial perspective view of another embodiment of the invention.
Figure 5A:
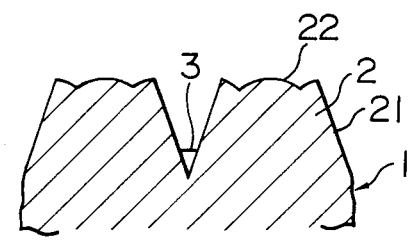
FIG. 5A is a partial sectional view of a lens unit in the embodiment shown in FIG. 4.
Figure 5B:
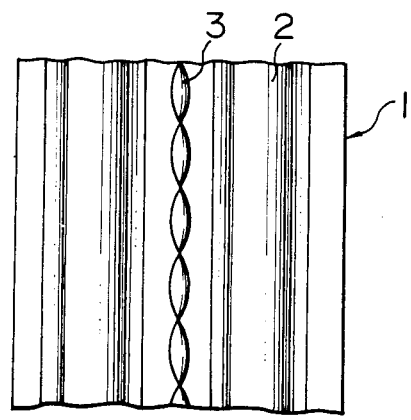
FIG. 5B is a front elevational view of the lens unit in FIG. 5A.
Figure 6:
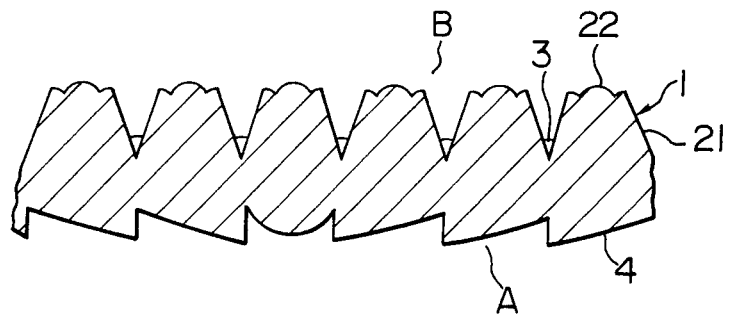
FIG. 6 is a partial sectional view of an embodiment in which a Fresnel lens is incorporated in the embodiment shown in FIGS. 4, 5A and 5B.
Figure 8:
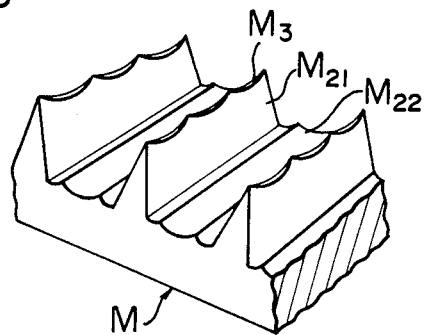
FIG. 8 is a perspective view of a part of the mold for producing the mold as shown in FIGS. 4 thru 6.

FIGS. 4 and 5A, 5B show another embodiment in which the crest 22 of each lens unit is constituted by three curved sections, unlike the first embodiment in which the crest 22 is constituted by a single continuous curve. At the same time, refraction element 3 for refracting the light in the vertical direction is formed in the trough between adjacent lens units. This lenticular lens 2 can be produced by, for instance, a mold half as shown in FIG. 8. Namely, this mold half M has portions M21 for forming the total reflection surfaces, portions M22 for forming the crests and the portion M3 for forming the refraction elements. Using this mold half, it is possible to easily produce, by, for example, hot press work a screen having a surface with a lenticular lens 2 the form of which is complementaly to the form of the mold half M. It is preferred to provide a Fresnel lens 4 on the projection side A as shown in FIG. 6, also in this embodiment.

Figure 7:
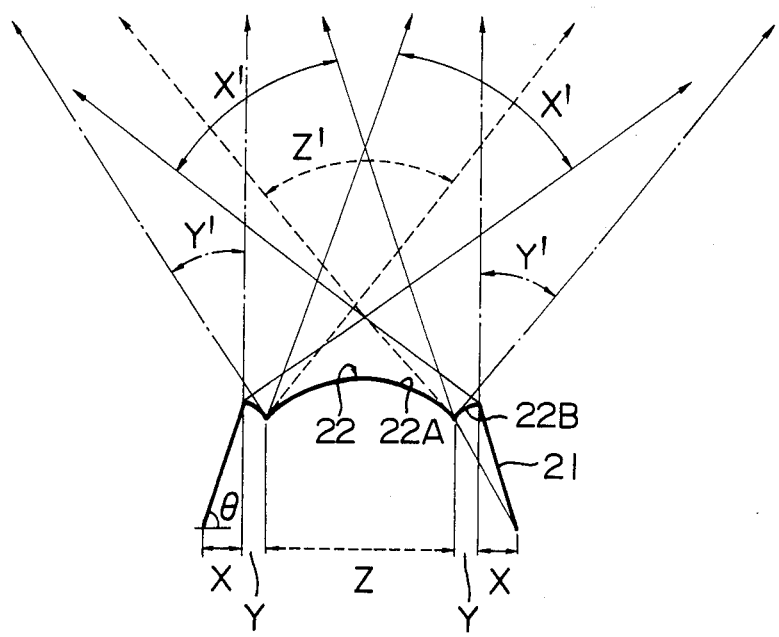
FIG. 7 is an illustration of an optical path as obtained when the embodiment shown in FIG. 6 is used as a screen plate.

A description will be made hereinunder as to the light-transmitting characteristics of the rear projection screen of the invention with specific reference to FIG. 7. FIG. 7 shows lens units explained by the embodiment shown in FIGS. 4 to 6. It will be seen from this Figure that the lens unit of this embodiment has three different optical paths. The lights X,X impinging straightforward upon the total reflection surfaces 21 on both sides are totally reflected by these surfaces 21 and are allowed to be emitted from the sections 22B as indicated by X',X'. On the other hand, the lights Y,Y coming straight into the curved sections 22B are emitted as lights Y',Y'. The light Z coming straight into the central large curved section 22A is emitted as indicated by Z'. These three components of light X',Y' and Z' are synthesized and the synthesized light emerges from the viewer's side of the screen. Therefore, it is possible to obtain a large angular field of vision in the horizontally direction which can be expressed in terms of $\beta$ value of 30° to 45°. The maximum gain Go of the light transmitted by the screen on the optical axis is given by the following formula.

*Go=foot Lambert (ft—L)/foot candle (ft —cd)*

The "$\beta$ value" mentioned above is the inclination angle of the light to the optical axis, at which the gain is decreased to ⅓ of the maximum gain Go. This can be frequently used as one of the indexes of the brightness of the screen. As explained before in connection with FIG. 7, the present invention aims at providing a screen which is improved to provide a greater angular field of vision not only in the horizontal direction but also in the vertical direction. The light coming through the projecting side A of the rear projection screen 1 and reaching the refraction element 3 is diffused in the vertical direction in the same manner as the horizontal diffusion of the light reaching the central large curved section 22 shown in FIG. 7. According to the invention, therefore, it is possible to enhance the angular field of vision in the vertical direction by a predetermined amount, as well as in the horizontal direction. It is thus possible to obtain a rear projection screen in which the angular field of vision in the horizontal direction and that in the vertical direction are increased well-balanced with each other. According to the invention, the width of the lens unit having the total reflection surfaces 21 is selected preferably to range between 0.3 and 1.0 mm.

Although in the illustrated embodiment the refraction elements 3 have a form of consecutive convexed lenses, this is not exclusive and the refraction elements 3 can have any other forms, such as, for example, consecutive prisms or consecutive triangles. All that is required of the refraction elements is to refract or diffuse the light vertically.

The optimum inclination angle $\theta$ of the total reflection surfaces on each lens unit can be derived from Snell's law in accordance with the refraction index of the material used. When methacrylic resin is used as the material, the inclination angle $\theta$ is selected preferably to range between 70° and 80°.

The rear projection screen of the invention may be made from a transparent material merely itself or containing a diffusion agent. Namely, in such a case, the diffusion agent is uniformly mixed with the material of the screen base member 1. Inorganic diffusion agents such as $SiO_2$, $CaCO_2$, $Al_2O_3$, $TiO_2$, $BaSO_4$, ZnO and glass powder, as well as organic diffusion agents, can be used effectively as the diffusion agent mixed with the material of the screen base member 1. In order to diminish the regular reflection on the surface, it is quite effective to form fine roughness on the viewer's side and/or projection side A of the screen. The rear projection screen of the invention is suitable for production from a synthetic resin material by, for example, hot press work, extrusion, injection molding or casting. Examples of the rear projection screen of the invention will be described hereinunder.

EXAMPLE

Figure 9A:
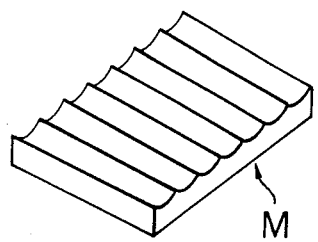
FIGS. 9A, 9B and 9C are illustrations of a mold for fabricating a rear projection screen and the shape of a lens unit.
Figure 9B:
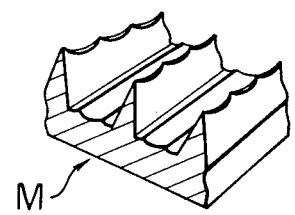
Figure 9C:
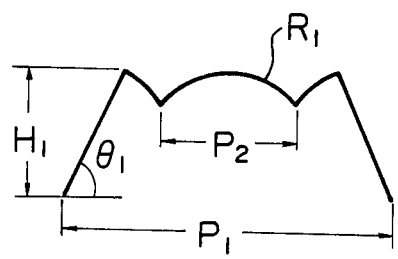
Figure 10:
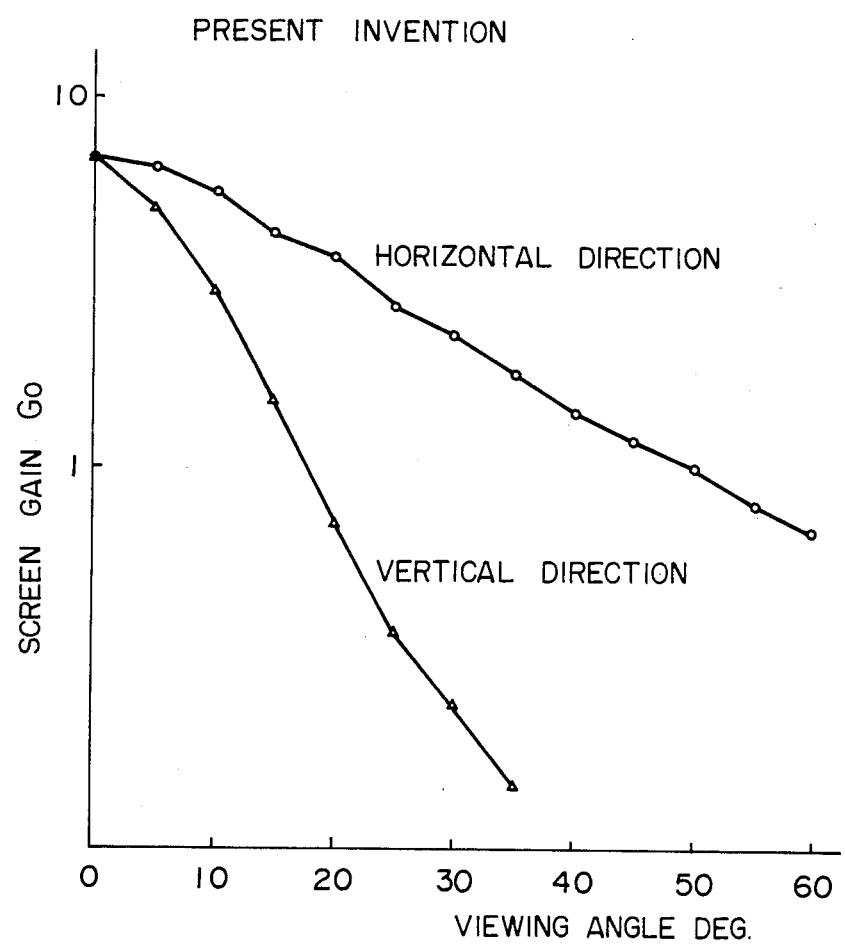
FIG. 10 is a graph showing the light transmitting characteristics of the rear projection screen in accordance with the Example.
Figure 11:
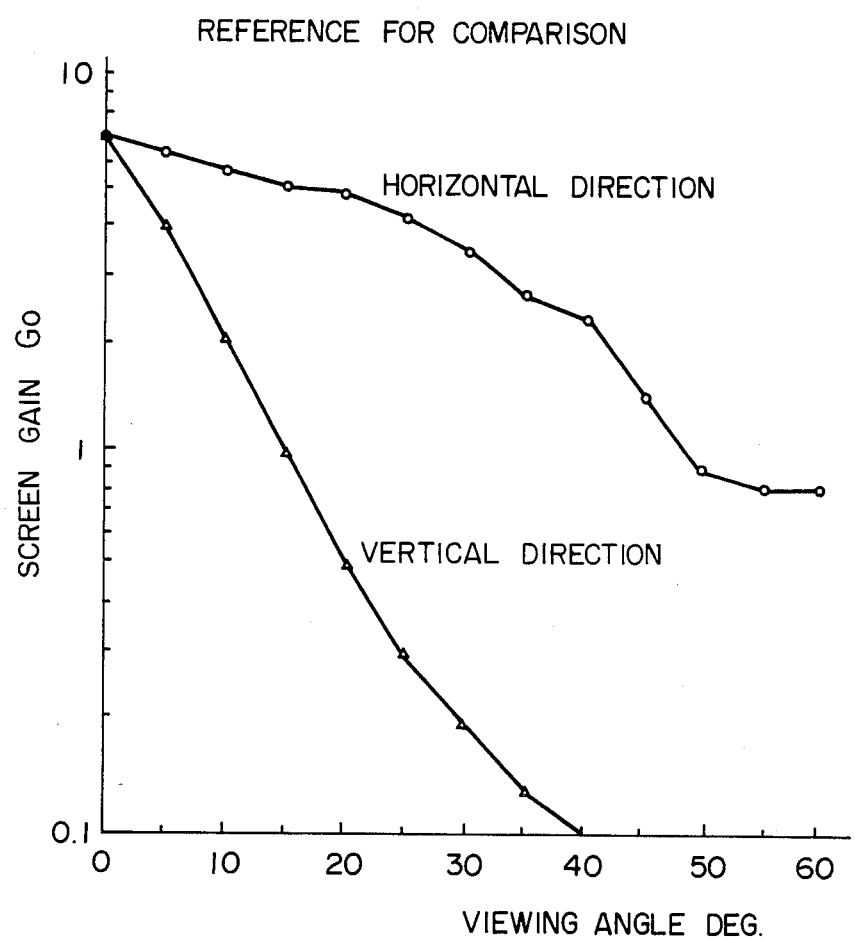
FIG. 11 is a graph showing the light transmitting characteristics of a rear projection screen as obtained in accordance with comparison Example.

A mold M having trough-like recesses as shown in FIG. 9A was prepared. The pitch of the recesses was 0.4 mm, while the radius of curvature thereof was 0.4 mm. Then, this mold was rotated to 90° and cut into a mold as shown in FIG. 9B. A light diffusion agent, which was in this case $SiO_2$, was mixed with an methacrylic resin having a refractive index of 1.49, such that $SiO_2$ weighs 23 g/m². A plate of 3 mm thick, made from this methacrylic resin was sandwiched between a mold half having a pattern of a Fresnel lens surface of a focal length f=1.1 m and a mold half having lens units as shown in FIG. 9B. This plate was hot-pressed at a temperature of 180° C. and under a pressure of 40 kg/cm² to be formed into a rear projection screen having a basic lenticular lens form as shown in FIG. 9C. In FIG. 9C, the angle $\theta_1$ is 72.5°, while $R_1$, $H_1$, $P_1$ and $P_2$ are 0.5 mm, 0.54 mm, 1.2 mm and 0.68 mm, respectively. A reference article of a rear projection screen for comparison was produced by the same method as above, using a mold of the same size and shape as above but having no pattern of recesses for forming the refraction elements 3. The light-transmitting characteristics of these two rear projection screens are shown in Table below, as well as in FIGS. 10 and 11.

TABLE

|  |  | evaluation characteristic values | | |
| --- | --- | --- | --- | --- |
|  |  | Go | $\alpha$* | $\beta$ |
| rear projection screen of invention | horizontal direction | 6.6 | 22 | 30.6 |
|  | vertical direction | 6.6 | 9.0 | 12 |
| reference article for comparison | horizontal direction | 6.64 | 30.7 | 37.6 |
|  | vertical direction | 6.68 | 6.6 | 9.5 |

*The $\alpha$ value represents ½ of the value Go.

As will be understood from Table and FIGS. 15 and 16, the rear projection screen of the invention offers high $\alpha$ and $\beta$ values in the vertical direction, although slightly low $\alpha$ and $\beta$ values in the horizontal direction in comparison with the reference article. Thus, the rear projection screen of Example showed an ideal light-transmitting characteristics which well fulfills the object of the invention.

As has been described, according to the invention, it is possible to obtain a rear projection screen in which the angular field of vision is increased both in the horizontal direction and vertical direction well-balanced in the visible field, thanks to a cooperation between the vertically diffusing lenticular lens and horizontally diffusing lentricular lens.

What is claimed is:

1. A rear projection screen having a viewer's side and a projection side, said rear projection screen comprising: a lenticular lens formed on said viewer's side and including a multiplicity of vertically extending lens units each being provided at its both sides with total reflection surfaces, said lenticular lens further including in the troughs between adjacent lens units a multiplicity of refraction elements which diffuse the light in the vertical direction.

2. A rear projection screen according to claims 1, wherein said screen has a Fresnel lens formed on said projection side thereof.

3. A rear projection screen according to claims 1 or 2, wherein said screen is made of a material containing a diffusion agent.

4. A rear projection screen according to any one of claims 1 or 2, wherein minute roughness is formed on said viewing side and/or said projection side.

* * * * *